Jan. 19, 1960 A. F. SEIBEL Re. 24,771
VAPORIZING AND MIXING UNIT
Original Filed Nov. 23, 1953 3 Sheets-Sheet 1
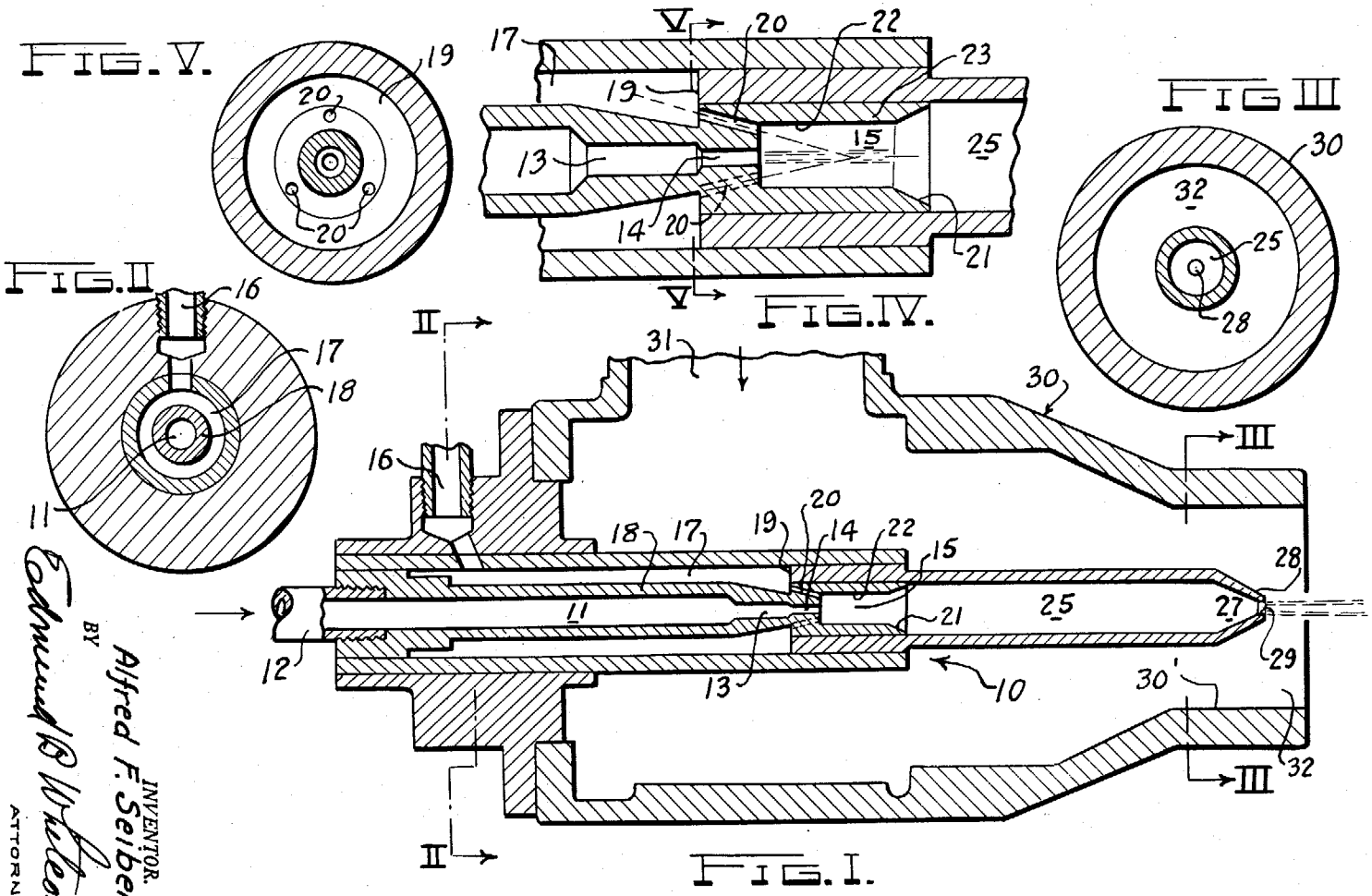
INVENTOR.
Alfred F. Seibel
BY
Edmund B. Whiteoak
ATTORNEY VAPORIZING AND MIXING UNIT
Original Filed Nov. 23, 1953 3 Sheets-Sheet 2
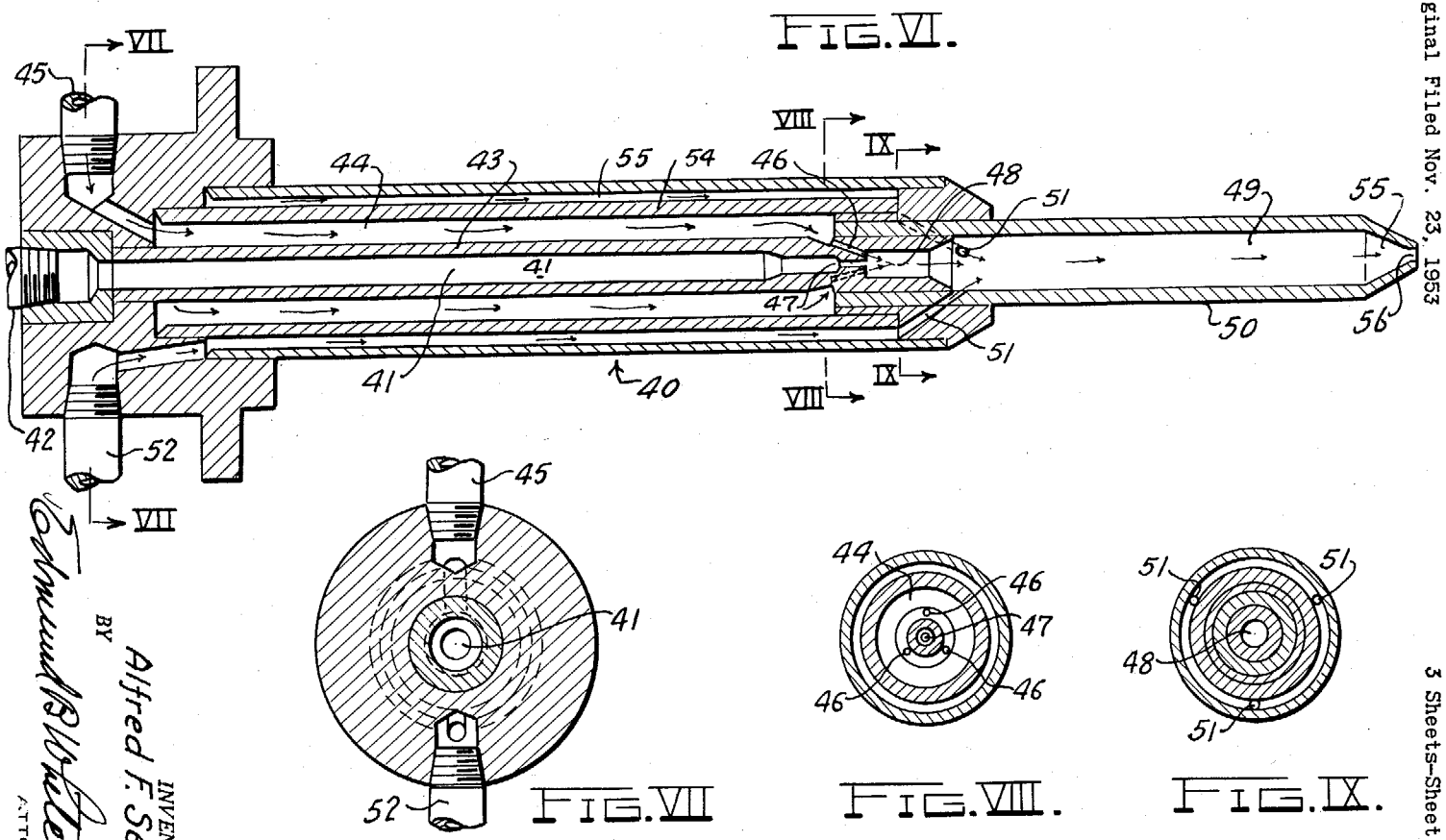
FIG. VI.
FIG. IX.
FIG. VIII.
FIG. VII
INVENTOR.
Alfred F. Seibel
BY
Edmund B. Whiteomb
ATTORNEY VAPORIZING AND MIXING UNIT
Original Filed Nov. 23, 1953 3 Sheets-Sheet 3
FIG. X.
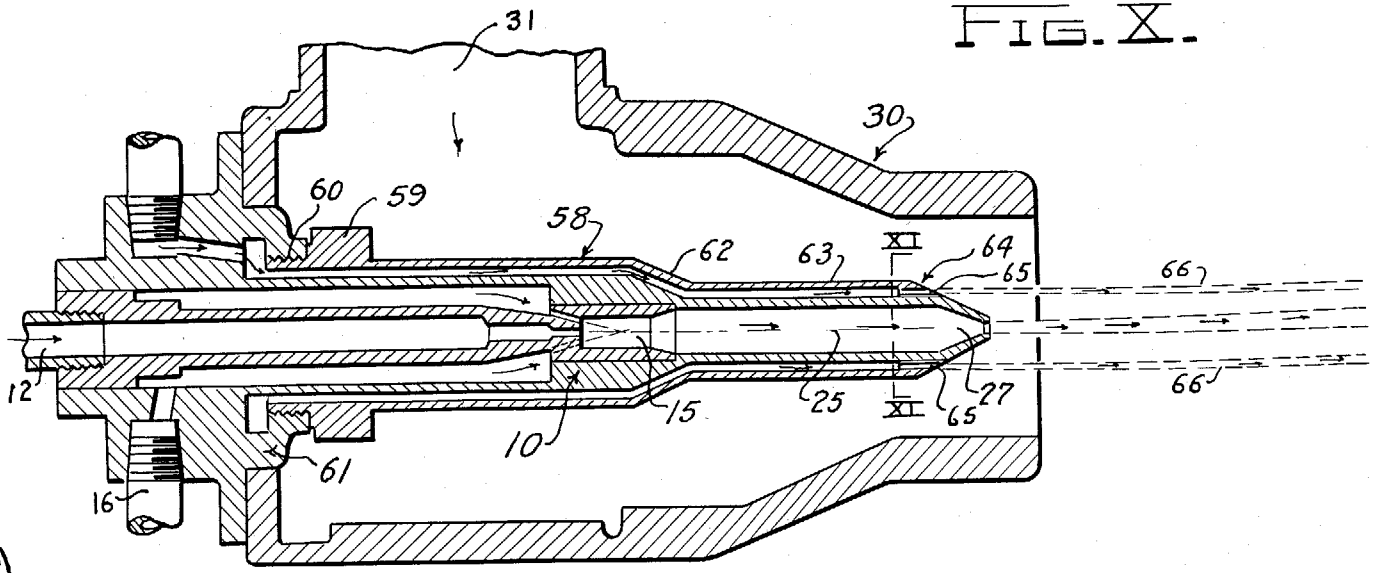
FIG. XI.
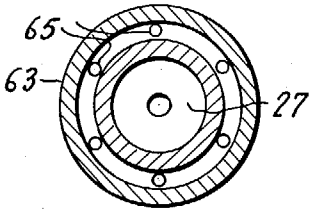
INVENTOR.
Alfred F. Seibel
BY
Edmund B Whiteomb
ATTORNEY United States Patent Office Re. 24,771
Reissued Jan. 19, 1960

24,771

VAPORIZING AND MIXING UNIT

Alfred F. Seibel, Toledo, Ohio

Original No. 2,764,455, dated September 25, 1956, Serial No. 393,633, November 23, 1953. Application for reissue August 7, 1958, Serial No. 755,833

8 Claims. (Cl. 239—427)

Matter enclosed in heavy brackets [ ] appears in the original patent but forms no part of this reissue specification; matter printed in italics indicates the additions made by reissue.

This invention relates to a fuel and gaseous mixing unit in which a liquid fuel such as oil, for example, is mixed with one or more gaseous fluids such as compressed air, steam or other gases and comprises such arrangement of passages therefor together with specially constructed mixing, vaporizing, expansion and turbulizing chambers and compression means as to produce a highly satisfactory combustible mixture for use in a furnace, for example, with a greatly reduced requirement of fuel supply, thereby making a very efficient unit of the type indicated.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a sectional elevation through a burner illustrating one embodiment of my invention;

Figure II is a section taken on the line II—II of Figure I;

Figure III is a section taken on the line III—III of Figure I;

Figure IV is an enlarged sectional elevation of the atomizing portion of the burner illustrated in Figure I;

Figure V is a section taken on the line V—V of Figure IV;

Figure VI is a sectional elevation through a burner illustrating an alternate form of my invention;

Figure VII is a section taken on the line VII—VII of Figure VI;

Figure VIII is a section taken on the line VIII—VIII of Figure VI;

Figure IX is a section taken on the line IX—IX of Figure VI;

Figure X is a longitudinal sectional elevation of a still further modification; and Figure XI is a cross section thereof taken on line XI—XI of Figure X.

In the drawings and particularly in Figure I, I have illustrated my invention in the specific embodiment shown as including a burner unit designated generally as 10 located in a suitable housing and adapted to be mounted for use with a furnace, particularly of the industrial type, not shown.

The burner unit itself forming the essential basis of the invention in the embodiment illustrated, comprises a vaporizing member 10, the oil or other liquid fuel supply to which is admitted under pressure to a central cylindrical passage 11 from a supply line 12. The discharge end of the passage 11 is reduced in diameter to form a passage 13 and terminates in a still further restricted outlet 14 adapted to discharge a fine stream of liquid fuel to be united with air, steam or other gas in a mixing or "first stage" treatment chamber 15. *The liquid fuel may be delivered to said chamber* 15 *by any other suitable supplying means provided with a predetermined area of orifice for the mixing chamber* 15.

Air or other suitable gas, steam, or the like, under pressure, for example, 45 to 50 pounds per square inch, is admitted from a source 16 through an annular chamber 17 surrounding the wall 18 of the passage 11 and discharges into chamber 15. The annular passage 17 is closed as at 19 except for a plurality of ports 20 inclined at a suitable angle, preferably substantially at such an exact angle as to *discharge the gaseous fluid so as to* converge in the line of the axis of the passage 11 or into the center of the stream of liquid fuel issuing from the outlet 14. The arrangement and inclination of these ports 20 is such that the impingement of the air on the fuel stream takes place [slightly forward of the center] in a plane adjacent the longitudinal central portion of the mixing chamber 15, *and* the oil and gas extremely divided up, vaporized and interunited as will hereinafter appear. Moreover, it will be noted from the drawing *illustrating one particular embodiment of my invention* that I prefer to use three ducts, two spaced 120 degrees circumferentially around the axis of the unit since I have found that by using an odd number of ducts, as shown, the meeting of the stream of compressed gaseous fluid centrally [of the axis] *longitudinally* of the unit has a very desirable effect in furthering the mixture, since there is no tendency of the contact of one of the streams to counterbalance the other but the gases and fuel are the more intimately mixed when an odd number of compressed gaseous fluid ducts are employed. The chamber 15 has an outwardly flared wall 21 and the proportions of the mechanism herein illustrated I have found to be very satisfactory in operation.

As forming means for providing a "second stage" of fuel expansion, turbulizing and intimately mixing means, I provide a relatively long cylindrical chamber 25 aligned with the [chambers] *passages* 11 and 17 *or with the first stage mixing chamber 15,* said chamber 25 being united at its outer end with a conically-shaped "third stage" or compressing chamber 27, formed as shown by providing the conical-shaped end wall 28.

It will be noted that *in the particular embodiment illustrated in Figures I through V* the special outlet in the wall 28 of the compression chamber 27 is formed with a "land" indicated at 29, the outlet nozzle thus arranged to suitably form a relatively long narrow stream of vaporized fuel for the combustible mixture.

In the embodiment shown in Figure I, I have shown a suitable housing 30 surrounding the entire burner unit 10 and adapted to conduct combustion or "blower" air under low pressure from a source 31 to an area 32 surrounding the vaporized fuel stream *or the combustible mixture* issuing from the unit 10 to form the [combustible mixture for] *final mixture of liquid fuel and gaseous fluid for ignition and* passage into a furnace.

This housing 30 is provided, as shown, with a cylindrical outlet section 30', the length thereof from the extreme outlet wall being varied as desired. Making this section 30' longer cooperates with the issuing stream of [combustible] mixture *of liquid fuel and gaseous fluid* to confine the flame into a relatively long narrow stream, whereas, making this cylindrical section 30' shorter permits this stream to widen out more.

As will be seen from examination of Figure IV, the air jets from the passage 20 strike the stream of oil *adjacent to or in the longitudinal axis of the mixing and expansion chamber 15* forming an extremely intimate mixture at the same time that expansion of the combined charge is taking place in its first stage. This rapidly moving mixture is restricted in movement by the cylindrical wall 22 of the mixing chamber 15, the relatively high pressures for the gases and the manner of engagement thereof with the fuel stream effecting, it is believed, a violent intermixing and interuniting or such change of the atomic pattern of the elements to form a highly combustible fuel mixture. *In Figure IV, while I diagrammatically indicate the convergence of the air stream slightly forward of the transverse center of the mixing chamber 15, of course the angles of the ducts 20 may be greatly varied for various installations, and in both Figures VI and X the indicated lines of egress of the compressed air show the same meeting the oil stream nearer the inlet end of chamber 15.*

This stream now enters the second expansion chamber 25 which is relatively long and in the form shown further breaks up and unites the air and fuel particles to an increased degree.

Thereupon, the mixed fuel and gas enters the compression chamber 27 at the extreme outer end of the unit and since there is a non-restricted connection between the turbulence chamber 25 and the compression chamber 27, no hard, fast plane of division occurs. The tapered and reduced shape of the chamber 27 is proportioned as shown, since I have found with this burner unit constructed to the proportions or dimensions illustrated has formed a very efficient burner effecting a saving of a large percent of fuel, even starting with heavy fuels. [It is extremely] *In the particular embodiment illustrated I have found it* desirable to cause the mixed fuel to emerge from the burner into the stream of [combustible] *combustion* air in a long narrow foundation from the burner unit and this land 29 which for this embodiment should not be more than 1/16 or less than 7/128 inch in length, causes the necessary limited divergence of the issuing fuel stream, along *the dash* lines *as* approximately indicated [as X and Y] on Figure I.

In the embodiment shown in Figures VI to IX, I have illustrated a further embodiment of my invention. Here, two gases are mixed with the fuel before it emerges from the burner. The burner unit indicated generally at 40 has a central fuel admitting chamber 41 receiving liquid fuel from a source 42. Surrounding the chamber 41 is a wall 43 and external to this is an annular chamber 44 adapted to receive air or other gas under pressure from a source 45. A plurality of inclined passages 46 conduct the pressure air to impingement on the fuel stream issuing from the orifice 47 into the first stage expansion and mixing chamber 48. The action of this mixing and expansion is to this point [exactly] *substantially* the same as has been described in connection with burner 10 (Figure I).

A cylindrical chamber 49 is mounted adjacent chamber 48, the wall 50 of which is provided with a plurality of ports 51 inclined toward the *longitudinal* center of the chamber 49 and adapted to receive air or other gas from a source 52 through an annular chamber 55 surrounding the wall 54 of the chamber 44. The chamber 49 now acts as a second stage expansion and mixing chamber for the atomized air and fuel, plus the second gas entering through the ports 51 and is compressed in the area 55 and ejected from the orifice 56 in the same manner as previously described for burner 10.

In Figure X, I have illustrated a still further embodiment of my invention in which I use the central unit 10 substantially identical with that illustrated in Figure I, together with the outer housing 30. These parts are substantially identical in dimensions and proportions as illustrated in connection with the invention shown in Figure I. However, in Figure X, I provide means for supplying a second gaseous fluid emerging at the outlet end of the unit 10 rather than entering the second expansion chamber illustrated in Figure VI, where two gases are there mixed with the liquid fuel. In Figure X, as shown, I surround the unit 10 with an annular enlarged tube 58 having a base portion 59 provided with a screw-threaded extension 60 adapted to be screw-threaded into a threaded end wall portion 61, which carries centrally thereof the unit 10. As indicated at 62, the outer wall 58 of the innermost section of the annular tube 58 converges at a plane adjacent the forward portion of the first expansion chamber 15. As shown in Figure X, this converging section 62 merges into a tubular portion 63 surrounding and spaced from the second expansion chamber 25. This section 63 is of smaller diameter than the portion 58 and preferably integral therewith and extends to adjacent the outer end of the unit 10 as shown. The outer end of section 63 terminates in an inclined face 64 merging with the outer surface of the "compression" chamber 27 of the unit 10 shown in Figure I. As more clearly shown in Figure XI, the outer end portion of the tube section 63 is provided through the face 64 with a series of openings 65. I illustrate six such longitudinally arranged passages 65 which direct the stream of the second gas substantially parallel to the axis of the unit 10 as indicated at 66 in Figure X.

*The use of the term "longitudinal axis" or "longitudinal central portion" herein is intended to mean the axis or longitudinal portion extending in the direction of the flow of oil issuing from the oil pipe 11 and issuing from the outlet passage 14 into and passing through the mixing chamber 15.*

It is apparent that, within the scope of the invention, modifications and different arrangements may be made other than is herein disclosed, and the present disclosure is illustrative merely, the invention comprehending all variations thereof.

What I claim is:

1. In a fuel and gaseous fluid vaporizer unit for a furnace, a [central passage] *supplying conduit* having a fuel inlet at one end and an outlet at the other end; [an annular] *means forming a* gaseous fluid passage [surrounding] *separate from* said [central passage] *fuel supplying conduit* having means to admit a gaseous fluid thereto at [the] *one* end thereof [adjacent the inlet of said central passage]; *means forming an enclosing wall providing a* [a relatively [short] *small,* longitudinally extended] mixing and expanding chamber fixed *in said unit* [to] *said chamber being of substantially larger transverse area than the fuel outlet of said conduit and having an inlet opening connected with said conduit outlet, said wall being provided with a plurality of gaseous fluid* [the outlet end of said [central passage] *fuel conduit* [and forming a closure for said surrounding passage], said chamber being provided with a plurality of [annularly arranged diagonal] gaseous fluid] ducts *extending diagonally with respect to the longitudinal axis of said chamber* from said [surrounding passage] *gaseous fluid supplying means* [into] *to* said mixing chamber, [said diagonal ducts arranged to converge in a plane forwardly of the central portion of said mixing chamber] *said ducts arranged to convergingly deliver gaseous fluid into contact with said liquid fuel in said chamber;* [and] *means forming* a relatively [long] enlarged [extension] *expansion chamber* fixed *in said unit and connected* to the outer end of said mixing chamber [, said [extension] *chamber* forming an expansion section] for extremely finely atomizing and turbulizing the mixture; [a restricted wall at the outer end of said expansion chamber] *and means at the other end of said expansion chamber* forming a compression chamber at the [emerging] end of said [extension] *expansion chamber,* said compression chamber having an outlet for the combustible mixture.

2. In an oil and air vaporizer unit for a furnace, a central tube having an oil inlet at one end and [a restricted] *an oil* outlet at the other end; an annular compressed air [tube surrounding] *supplying means associated with* said central tube having means to admit compressed air thereto [at the end] adjacent said oil [inlet of said] *supplying* central tube; [a relatively [short] *small* longitudinally extended] *means forming an enclosing wall providing a* mixing and expanding chamber fixed to the outlet end of said central tube into which said oil outlet opens; *said chamber being of substantially larger transverse area than the fuel outlet of said oil tube*; a plurality of annularly arranged diagonal air ducts from said compressed air passage *to* [into] said mixing chamber [with said oil outlet,] and said diagonal air ducts arranged to [converge in a plane adjacent the central portion of] *convergingly deliver compressed air into contact with said oil in* said chamber, *means forming* a relatively [long tubular extension] *enlarged expansion chamber* fixed to the outer end of said mixing chamber, said [extension] *enlarged expansion chamber* forming an extremely finely atomizing and turbulizing section; [a restricted outlet] *means* forming a compression chamber at the emerging end of said [extension] *expansion chamber*; and means to deliver a combustible mixture from said unit. [in a narrow long stream.]

3. In a fuel and gaseous fluid vaporizer unit, *means forming* a central passage having a fuel inlet at one end and a restricted passage at the outlet end thereof; an annular gaseous fluid passage surrounding said central passage having means to admit gaseous fluid thereto at the end thereof adjacent the inlet of said central passage; *means forming an enclosing wall providing* a relatively short longitudinally extending mixing and expanding chamber *said chamber being of substantially larger transverse area than the fuel outlet of said passage* fixed to the outlet end of said central passage and having an end wall forming a closure for said surrounding passage, said [chamber] *wall* being provided with a plurality of annularly arranged diagonal gaseous fluid inlet ducts from said surrounding passage extending through said end wall into said mixing chamber, the outlet surfaces of said ducts arranged in the plane of the outlet surface of said restricted fuel outlet, said diagonal ducts arranged to [converge in a plane forwardly of the central portion of] *convergingly deliver said gaseous fluid into contact with said fuel in* said mixing chamber *means forming* and a relatively long enlarged extension fixed to the outer end of said mixing chamber, said extension forming an expansion section for extremely finely atomizing and turbulizing the mixture; a restricted wall at the outer end of said expansion chamber forming a compression chamber at the emerging end of said extension, said compression chamber having an outlet for the combustible mixture.

4. In a fuel and gaseous fluid vaporizer unit, *means forming* a central passage having a fuel inlet at one end and a restricted passage at the outlet end thereof; an annular gaseous fluid passage surrounding said central passage having means to admit gaseous fluid thereto at the end thereof adjacent the inlet of said central passage; *means forming an enclosing wall providing* a relatively short longitudinally extending mixing and expanding chamber, *said chamber being of substantially larger transverse area than the fuel outlet of said central passage and* fixed to the outlet end of said central passage and having an end wall forming a closure for said surrounding passage, said chamber being provided with a plurality of annularly arranged diagonal gaseous fluid inlet ducts from said surrounding passage extending through said end wall *to* [into] said mixing chamber, the outlet surfaces of said ducts arranged in the plane of the outlet surfaces of said restricted fuel outlet, said diagonal ducts arranged to *convergingly deliver said gaseous fluid into contact with said fuel in* [converge centrally in the stream of fuel issuing from said central restricted outlet end in a plane located forwardly of the central portion of] said mixing chamber; and a relatively long enlarged hollow extension fixed to the outer end of said mixing chamber; an expanded opening outlet from said mixing chamber to said extension chamber, said extension chamber forming an expansion section for extremely finely atomizing and turbulizing the mixture, and a compression chamber connected with said extension chamber, said compression chamber being provided with an outlet for the combustible mixture.

5. In a fuel and gaseous fluid vaporizer unit for a furnace, *means forming* a central passage having a fuel inlet at one end and an outlet at the other end; an annular gaseous fluid passage surrounding said central passage having means to admit a gaseous fluid thereto at the end thereof adjacent the inlet of said central passage; *means forming an enclosing wall providing* a relatively short longitudinally extended mixing and expanding chamber fixed to the outlet end of said central passage and forming a closure for said surrounding passage, *said chamber being of substantially larger transverse area than the fuel outlet of said central passage and* said chamber being provided with a plurality of annularly arranged diagonal gaseous fluid ducts from said surrounding passage *to* [into] said mixing chamber, said diagonal ducts arranged to [converge in a plane forwardly of the central portion of] *convergingly deliver said gaseous fluid into contact with said fuel in* said mixing chamber; and a relatively long enlarged extension fixed to the outer end of said mixing chamber; another annular passage surrounding said first-mentioned annular gaseous fluid passage connected at one end with an inlet end provided at its other end with diagonally arranged ducts for connecting said second annular passage with the inlet end of said [extension] *expansion* chamber, said [extension] *expansion* chamber forming an expansion section for extremely finely atomizing and turbulizing the mixture; a restricted wall at the outer end of said expansion chamber forming a compression chamber at the emerging end of said extension, said compression chamber having an outlet for the combustible mixture.

6. In a fuel and gaseous fluid vaporizer unit for a furnace, a central passage having a fuel inlet at one end and an outlet at the other end; an annular gaseous fluid passage surrounding said central passage having means to admit a gaseous fluid thereto at the end thereof adjacent the inlet of said central passage; a relatively short longitudinally extended mixing and expanding chamber fixed to the outlet end of said central passage and forming a closure for said surrounding passage, said chamber being provided with a plurality of annularly arranged diagonal gaseous fluid ducts from said surrounding passage into said mixing chamber, said diagonal ducts arranged to *convergingly deliver said gaseous fluid into contact with said fuel in* [converge in a plane forwardly of the central portion of] said mixing chamber; and a relatively long enlarged extension fixed to the outer end of said mixing chamber; another annular passage surrounding said first-mentioned annular gaseous fluid passage connected at one end with an inlet and provided at its other end with a reduced annular passage surrounding said extension chamber, said reduced extension of said second annular passage being provided with a plurality of outlet ducts surrounding said expansion chamber, said ducts arranged substantially parallel to the axis of said central fuel passage, said extension forming an expansion section for extremely finely atomizing and turbulizing the mixture; a restricted wall at the outer end of said expansion chamber forming a compression chamber at the emerging end of said extension, said compression chamber having an outlet for the combustible mixture, the ducts of said second annular passage arranged to discharge a gaseous fluid annularly around the discharge of said combustible mixture.

[7. A fuel supply means having a discharge outlet; a gaseous fluid supplying means; a mixing and expanding chamber into which said fluid discharge outlet opens; angularly positioned conducting means between said gaseous fluid supply means and said mixing chamber arranged to deliver gaseous fluid into said chamber into the stream of fuel issuing from said discharge outlet; an enlarged expansion chamber connected with said mixing chamber; and a compression chamber connected thereto having an outlet therefrom.]

*8. In a mixing and vaporizing nozzle, an inlet pipe adapted to supply a liquid fuel to the nozzle, said pipe having a discharge outlet; means forming an enclosing wall providing an enlarged mixing and expansion chamber connected with the outlet end of said fuel inlet pipe, the area of said chamber transversely to the longitudinal axis being substantially greater than that of said discharge outlet of said fuel inlet pipe; a conduit from a source of gaseous fluid supply, said conduit positioned adjacent said fuel inlet pipe and adapted to supply a gaseous fluid under pressure to said nozzle; a plurality of circumferentially arranged ducts extending from said conduit to said mixing chamber, said ducts positioned at an angle to the longitudinal axis of said first mentioned chamber and arranged to convergingly deliver a plurality of gaseous fluid streams into contact with the fuel in said first mentioned mixing and expanding chamber; means forming an additional enlarged expansion chamber connected with the outlet end of said first mixing chamber, the volume of said additional expansion chamber being substantially greater than the volume of said mixing chamber; means forming a compression chamber of reduced volume from said additional expansion chamber, said compression chamber connected with said second mentioned expansion chamber; and a compressed mixture outlet connected with said compression chamber.*

*9. In a mixing and vaporizing nozzle, an inlet pipe adapted to supply a liquid fuel to the nozzle, said pipe having a discharge outlet; means forming an enclosing wall providing an enlarged mixing and expansion chamber connected with the outlet end of said fuel inlet pipe, the area of said chamber transversely to the longitudinal axis being substantially greater than that of said discharge*

*outlet of said fuel inlet pipe; a conduit from a source of gaseous fluid supply, said conduit positioned adjacent said fuel inlet pipe and adapted to supply a gaseous fluid under pressure to said nozzle; a series of three circumferentially arranged ducts extending from said conduit to said mixing chamber, said ducts positioned at an angle to the longitudinal axis of said first mentioned chamber and having the outlet terminals of said ducts positioned adjacent the discharge outlet of said fuel inlet pipe and arranged to convergingly deliver a plurality of gaseous fluid streams into contact with the fuel in said first mentioned mixing and expanding chamber; means forming an additional enlarged expansion chamber connected with the outlet end of said first mixing chamber, the volume of said additional expansion chamber being substantially greater than the volume of said mixing chamber; means forming a compression chamber of reduced volume from said additional expansion chamber, said compression chamber connected with said second mentioned expansion chamber; and a compressed mixture outlet connected with said compression chamber.*

References Cited in the file of this patent or the original patent

| | | |
|---|---|---|
| 1,330,522 | Dunham | Feb. 10, 1920 |
| 1,451,063 | Anthony | Apr. 10, 1923 |
| 1,522,951 | Gilmore | Jan. 13, 1925 |
| 1,647,956 | Butcher | Nov. 1, 1927 |
| 1,999,121 | Wilson | Apr. 23, 1935 |
| 2,239,025 | Vigneault | Apr. 22, 1941 |
| 2,303,104 | Abbey | Nov. 24, 1942 |
| 2,368,373 | Morell | Jan. 30, 1945 |
| 2,672,727 | Brown | Mar. 23, 1954 |

FOREIGN PATENTS

| | | |
|---|---|---|
| 15,808 | Great Britain | of 1911 |